PRECISION SIGNAL PROCESSOR FOR PULSE DURATION
MODULATION TELEMETRY
Filed Aug. 18, 1964
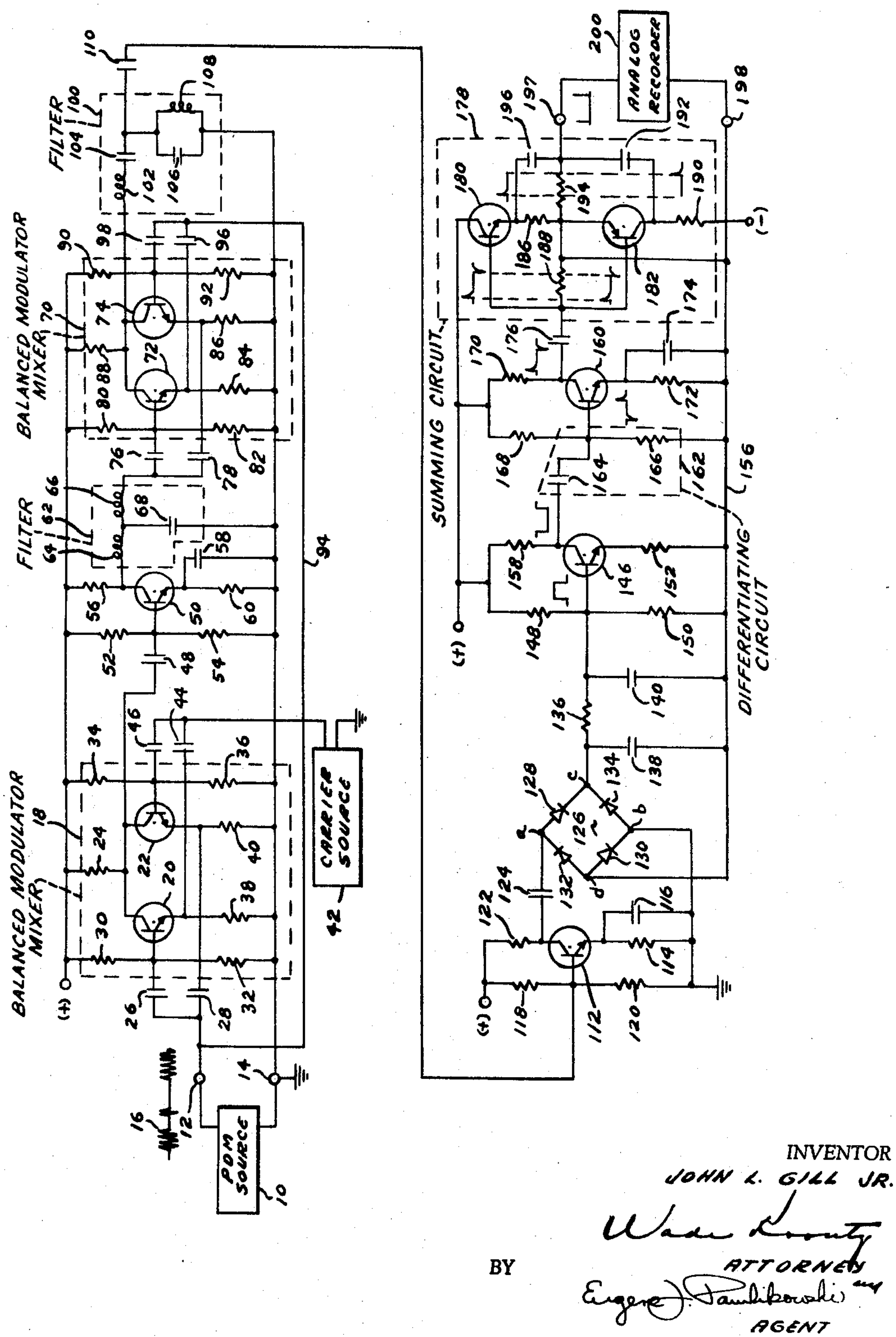
INVENTOR
JOHN L. GILL JR.
BY Wade Koontz
ATTORNEY
Eugene J. Pawlikowski
AGENT United States Patent Office 3,371,280 Patented Feb. 27, 1968

3,371,280

PRECISION SIGNAL PROCESSOR FOR PULSE DURATION MODULATION TELEMETRY

John L. Gill, Jr., 7977 Blackshear Drive, Dayton, Ohio 45424

Filed Aug. 18, 1964, Ser. No. 390,486
4 Claims. (Cl. 325—323)

ABSTRACT OF THE DISCLOSURE

Receiver for removing frequency variations in a received pulse duration modulated carrier wave signal. The received signal is mixed with a locally generated sinusoidal signal, and all but the lower sideband of the mixed signal is removed. The lower sideband signal is then mixed with the received pulse duration modulated carrier wave signal and all but the upper sideband is removed. The resulting signal is a pulse duration modulated carrier wave signal with the frequency of the carrier wave now unvarying and equal to the frequency of the locally generated signal. The resulting signal is then converted into a pulse train representing the leading and trailing edges of the original pulses.

The invention described herein may be manufactured and used by or for the United States Government for governmental purposes without payment to me of any royalty thereon.

This invention relates to an electronic circuit for converting pulse duration modulation telemetry information into a pulse train representing the leading and trailing edges of the original telemetry pulses.

In a pulse duration modulation system, or PDM system, the time that the transmitter carrier is on the air is divided into known amounts, each amount representing a different channel of information. The information is converted to a value of time and the transmitter carrier is turned on to transmit a pulse of energy for the length of time which represents the magnitude of the measurand, i.e., the variable about whose state, level, or value knowledge is desired. The outputs of the various transducers are applied to a commutation switch so that the first pulse represents the information from the first transducer, and latter pulses follow one after the other in succession. The time that the transmitter remains on, therefore, is proportional to the value of each measurand sampled in turn. Accordingly, the type of PDM with which this application is mainly concerned is that in which one edge of each pulse is fixed in the time sequence and the other edge varies in accordance with the information, the duration of each pulse being proportional to the instantaneous value of the information at the time the variable edge of the pulse occurs.

The problem of rapidly producing analog signals from pulse duration modulation information becomes difficult when, for one reason or another, the signal displays unstable frequency characteristics within the duration of the pulse. As one example, when a Doppler shift is encountered the frequency of the PDM signal is constantly shifting between roughly ascertainable limits. Producing analog signals of telemetered PDM information from an airborne target causing the Doppler effect has in the past been very difficult to achieve because of the presence of frequency drift.

Accordingly, an object of the invention is to provide a circuit in which the effects of Doppler shift and other undesirable frequency variations appearing in PDM signals is eliminated.

Another object of the invention is the provision of a signal processor in which a sharply sensitive frequency comparison system converts pulse duration signals into a series of pulses separated by the interval corresponding to the original information.

Other objects will appear hereinafter.

In the drawing the single figure is a schematic circuit of the preferred form of the invention.

In the circuit shown in the drawing a source 10 of PDM signals is coupled to input terminals 12 and 14, the latter being referenced to ground. The wave train 16 represents a typical PDM signal showing variations in the duration of the individual pulses.

The reference character 18 generally designates a balanced modulator-mixer including two NPN transistor amplifiers 20 and 22 provided with collector voltage from a unidirectional positive source (+) through a load resistor 24. The base of amplifier 20 is capacitively coupled by capacitor 26 to input terminal 12. A similar capacitive connection between terminal 12 and the emitter of amplifier 22 includes a capacitor 28. The base amplifier 20 interconnects a voltage divider including resistors 30 and 32. A similar voltage divider including resistors 34 and 36 has its midpoint connected to the base of amplifier 22. Emitter resistors 38 and 40 of amplifiers 20 and 22, respectively, are coupled to ground terminal 14.

A source 42 of a constant sinusodial frequency carrier signal is coupled to the emitter of amplifier 20 by capacitor 44. A capacitor 46 connects the carrier output of source 42 to the base of amplifier 22.

The collectors of amplifiers 20 and 22 are coupled through a capacitor 48 to the base of a transistor amplifier 50. The base of amplifier 50 connects to the junction of a voltage divider including resistors 52 and 54. A load resistor 56 returns the collector of amplifier 50 to the unidirectional source (+). A bypass capacitor 58 and resistor 60 return the emitter of amplifier 50 to ground.

The output of amplifier 50 is passed through a conventional low pass filter generally designated 62 comprising series connected inductors 64 and 66 and a capacitor 68.

The output of filter 62 is fed to a balanced modulator-mixer generally designated 70 and comprising transistor amplifiers 72 and 74. A capacitor 76 couples the base of amplifier 72 to filter 62. Similarly, a capacitor 78 interconnects the emitter of amplifier 74 to the output of filter 62.

The base of amplifier 72 connects to the junction of two resistors 80 and 82 forming a voltage divider. A resistor 84 returns the emitter of amplifier 72 to ground. In amplifier 74, a resistor 86 interconnects the emitter thereof and ground. A common load resistor 88 serves both amplifiers 72 and 74. The base of amplifier 74 couples to the junction of voltage divider resistors 90 and 92. As will be seen in the drawing, input terminal 12 of source 10 is coupled by line 94 to balanced modulator-mixer 70. Specifically, line 94 extends to the emitter of amplifier 72 through a capacitor 96 and similarly extends to the base of amplifier 74 through a capacitor 98.

Following balanced modulator-mixer 70 is a band-pass filter generally designated 100 and comprising a series-connected inductor 102 and capacitor 104 and the parallel connection comprising a capacitor 106 and inductor 108. As is characteristic, the frequencies for which filter 100 can transmit power without attenuation constitute the pass bands.

The output of filter 100 is coupled through a capacitor 110 to a transistor amplifier 112 having its emitter returned to ground through a resistor 114 bypassed by a capacitor 116. The base of amplifier 112 connects to the junction of voltage divider resistors 118 and 120. A load resistor 122 returns the collector of amplifier 112 to the positive (+) source.

The output of amplifier 112 is coupled through a capacitor 124 to the input terminals *a* and *b* of a full wave rectifier generally designated 126 comprising diodes 128, 130, 132 and 134. After passing through a suitable power filter, herein shown as a pi-section RC filter comprising resistor 136 and capacitors 138 and 140, the rectified output is substantially square through reduction of the ripple. Essentially complete ripple reduction can be achieved through use of added filter sections, as those skilled in the art understand. The unidirectional square wave, a pulse waveform of which is shown, is fed to a transistor amplifier 146 having the base thereof coupled to the junction of the voltage divider resistors 148 and 150. A resistor 152 returns the emitter of amplifier 146 to a bus 156 coupled to output terminal *d* of rectifier 126. Collector voltage for amplifier 146 is supplied through load resistor 158. The squared output of amplifier 146 is applied to a transistor amplifier 160 preceded by a differentiator generally designated 162 and including a capacitor 164 and a resistor 166. Resistor 166 and resistor 168 interconnect the positive (+) source and bus 156. The collector of amplifier 160 is connected to the positive (+) source through a load resistor 170. A resistor 172 and a capacitor 174 return the emitter of amplifier 160 to bus 156.

After inversion and amplification in amplifier 160 the output is applied through a capacitor 176 to a summing circuit generally designated 178. This circuit comprises NPN and PNP transistor amplifiers 180 and 182, respectively. The emitters of amplifiers 180 and 182 are coupled by a resistor 186. The emitter of amplifier 182 is coupled to the base of amplifier 180 through a resistor 188, and also is coupled to the bus 156. Being an emitter follower, the collector of amplifier 180 is coupled directly to the positive (+) source. The collector of amplifier 182 is connected by a load resistor 190 to a unidirectional negative voltage source (—), and is also coupled to the emitter thereof through a capacitor 192 and resistor 194. A capacitor 196 extends from the junction of resistor 194 and capacitor 192 to the emitter of amplifier 180. This same junction represents an output terminal 197. The other output terminal 198 is represented by the bus 156. A suitable analog recorder 200 is fed by output terminals 197 and 198.

In operation, with both the PDM signal and the constant wavelength carrier signal fed to balanced modulator-mixer 18, the input to amplifier 50 will consist of the sum and the difference of the two original frequencies. Those skilled in the art will understand that since the effect produced in the circuit of amplifier 20 is 180° out of phase with that produced in amplifier 22, the output voltage is proportional to the sum and difference in the collector currents. Accordingly, the reference carrier and the instantaneous value of the frequency in each pulse of the PDM input are suppressed.

The low pass filter 62 is tuned to remove the sum frequency of the output of amplifier 50, leaving only the beat or difference frequency. Although only one section of low pass filtering is shown herein, it will be understood that as many sections as are necessary to establish the proper bandpass may be provided. The output signal of filter 62 is coupled to balanced modulator-mixer 70 simultaneously with the input to the balanced modulator-mixer 70 of the PDM signal fed over line 94.

With both signals fed to amplifiers 72 and 74 the output again will consist of the sum frequency and the difference or beat frequency in the manner previously described for balanced modulator-mixer 18. This signal is directly coupled from the collectors of amplifiers 72 and 74 to band-pass filter 100.

The function of filter 100 is to attenuate the difference frequency produced by balanced modulator-mixer 70 and pass only the sum frequency. The difference frequency is, therefore, attenuated and only the sum frequency is coupled through capacitor 110 to the base of amplifier 112.

In accordance with the invention, filter 100 must be conditioned to pass only a signal varying at the frequency of the reference signal supplied by source 42. Accordingly, filter 100 will attenuate all frequencies except those of the frequency of the reference carrier from source 42. Filtering out all but the desired sum frequency produces at the base of amplifier 112 a signal varying at the reference frequency of source 42 and having a pulse envelope duration identical to that of each pulse duration modulated signal from input source 10. Stated differently, the pulse width characteristic of each signal in the train of PDM input signals is translated to a signal at the constant reference frequency. As such, the pulse width is preserved but now the wavelength is constant.

The signal at the reference frequency is amplified by amplifier 112 and rectified by full wave rectifier 126 to produce a unidirectional voltage positive with respect to bus 156. After filtering in the filter section comprising resistor 136 and capacitors 138 and 140 the signal supplied to the base of amplifier 146 is amplified into a substantially square wave. For this purpose, amplifier 146 preferably operates at or near saturation. Where even steeper leading and trailing edges of the output of amplifier 146 are desired, a Schmitt trigger circuit to replace amplifier 146 readily suggests itself. In any case, the base duration of the square wave input applied to differentiator 162 will be the same as the duration of each PDM pulse fed to input terminals 12 and 14.

The differentiator 162 preferably will have characteristics enabling it to differentiate a pulse of the lowest duration expected at input terminals 12 and 14. It, therefore, will be appreciated that the choice of constants for capacitor 164 and resistor 166 of differentiator 162 will be dictated by the pulse representing the shortest measurand contained in the telemetered information.

Amplifier 160 inverts the differential output of differentiator 162 and supplies this signal to summing circuit 178. Emitter follower amplifier 180 passes each positive spike to summing resistor 194. The operation of amplifier 182 is such that for each negative base signal the voltage at the collector thereof increases in the positive direction. The pulses formed at the junction of capacitors 192 and 196 are coupled to analog recorder 200 and are ready for external use. The input to analog recorder 200, therefore, appears as a series of positive pulses, the separation of one to the next representing the leading and trailing edges of each input PDM pulse representing the information received. Moreover, it will be apparent that the pulses fed to recorder 200 assure that the information recovered in the proper sequence. This means that the pulse representing information taken from one information channel will follow the pulses representing information taken from the preceding channel.

The waveforms shown toward the output end of the circuit illustrated in FIG. 1 indicate the operation for the first pulse duration signal in input signal 16.

In one embodiment of the invention, a reference frequency of 2.5 kilocycles from source 42 was employed. Also, during actual tests involving the reception of PDM telemetered information from an airborne target it was found that variations in the carrier frequency of the PDM signal because of fluctuations introduced by Doppler or other phenomena were on the order of 400 to 1200 c.p.s. As previously explained, filter 100 will be sharply tuned to 2.5 kc. Assuming this range of Doppler shift, the maximum range of difference frequencies at the output of amplifier 50 is on the order of 1.3 to 2.1 kilocycles. Filter 62, therefore, will have a band pass accepting frequencies within the range of 1300 to 2100 cycles.

It will be understood that other selections of carrier frequencies from source 42 are readily acceptable and this factor is in no way to be considered a limiting feature of the invention.

A specific example to improve understanding of the advantageous features of the invention will now be given. Let it be assumed that the frequency of a pulse envelope one second in duration from source 10 is 400 c.p.s. Let it also be assumed that the frequency of the reference carrier at source 42 is 2.5 kc. The two input frequencies applied to the balanced modulator-mixer 18 produces signals at two prominent output frequencies. These are the sum and difference of the two original frequencies, that is 2.9 kc. and 2.1 kc. The latter figure is within the band pass of filter 62 so that the filtered output is a pulse one second in duration and varying at 2.1 kc. With the difference signal now fed to balanced modulator-mixer 70 simultaneously with the original signal frequency fed to balanced modulator-mixer 70 from source 10, the output of this stage will consist of the sum frequency of 2.5 kc. and the difference frequency of 1.7 kc. Filter 100 attenuates the difference frequencies and passes only the sum frequency of 2.5 kc. This sum frequency is amplified in amplifier 112, rectified by rectifier 126, and, following suitable filtering to produce a smooth wave, is amplified and inverted in amplifier 146. It will be observed that the signal at the collector of amplifier 146 has the pulse duration information contained in the PDM pulse applied to input terminals 12 and 14. Following differentiation in differentiator 162 and amplification and inversion in amplifier 160, the interval separating the exponential positive and negative spikes at the collector of amplifier 160 identically corresponds to the pulse duration of the input pulse. Inasmuch as amplifier 180 responds only to the positive spike, a pulse of the same polarity is passed to summing resistor 194. The response of amplifier 182 to the negative spike, and the subsequent inversion in this amplifier, produces a positive pulse applied to summing resistor 194. The input fed to analog recorder 200 is, therefore, a pulse train representing the leading and trailing edges of the original telemetry PDM pulses.

The input signals fed to analog recorder 200 are eminently suitable for applications in which the production of a permanent analog record of the pulse duration modulation information is desired. One well used method is to read out the various channels of information on a tape chart, roll strip, or the like, from which a side-by-side comparison of the original input information, any intermediate and the final analog display can be made. The analog signals produced by the invention embodiment readily correspond to the respective pulse duration of the channels represented in the input PDM information. Thus, a major feature of the invention is the simplicity of the train of analog pulses representing the information transmitted in each channel, and the direct relation between information magnitude and interval separating successive analog pulses. Major considerations formerly given to fluctuations introduced by Doppler effect and other deleterious phenomena may now be ignored, thereby permitting immediate reduction of the input data at a speed heretofore unattainable.

Although only one embodiment of the invention has been illustrated and described, it will be equally apparent to those skilled in the art that other changes and modifications may be made therein without departing from the spirit of the invention or the scope of the appended claims.

I claim:

1. Apparatus for removing frequency variations in a received pulse duration modulated carrier wave signal comprising; a balanced modulator-mixer circuit having a first transistor and a second transistor; each of said transistors having an emitter, a collector and base circuit; means for applying said pulse duration modulated carrier wave signal to the base of the first transistor and the emitter of the second transistor; means for producing a local sinusoidal signal of a predetermined frequency; means for applying said local sinusoidal signal to the base of the second transistor and to the emitter of the first transistor, whereby the applied signals are canceled in the collector output of the transistors; first filter means, connected in the collector output of the transistors for eliminating the sum frequencies from said output and for passing the difference frequencies; a second balanced modulator-mixer circuit having a third transistor and a fourth transistor; each of the transistors of said balanced modulator-mixer having, an emitter, a collector and a base circuit; means for applying the output of the first filter means to the base of the third transistor and the emitter of the fourth transistor; means for applying said pulse duration modulated carrier wave signal to the base of the fourth transistor and the emitter of the third transistor, whereby the applied signals are canceled in the collector output of the third and fourth transistors; a second filter means connected in the collector output of the third and fourth transistors for eliminating the difference frequencies from said output and for passing the sum frequencies, whereby the output signal has the same duration modulation as the received signal with a constant fixed frequency carrier.

2. Apparatus for removing frequency variations in a received pulse duration modulated carrier wave signal comprising; a balanced modulator-mixer circuit having a first transistor and a second transistor; each of said transistors having an emitter, a collector and base circuit; means for applying said pulse duration modulated carrier wave signal to the base of the first transistor and the emitter of the second transistor; means for producing a local sinusoidal signal of a predetermined frequency, which is more than twice the highest frequency appearing in the received signal; means for applying said local sinusoidal signal to the base of the second transistor and to the emitter of the first transistor, whereby the applied signals are canceled in the collector output of the transistors; first filter means, connected in the collector output of the transistors for eliminating the sum frequencies from said output and for passing the difference frequencies; a second balanced modulator-mixer circuit having a third transistor and a fourth transistor; each of the transistors of said balanced modulator-mixer having, an emitter, a collector and a base circuit; means for applying the output of the first filter means to the base of the third transistor and the emitter of the fourth transisor; means for applying said pulse duration modulated carrier wave signal to the base of the fourth transistor and the emitter of the third transistor, whereby the applied signals are canceled in the collector output of the third and fourth transistors; a second filter means connected in the colelector output of the third and fourth transistor for eliminating the difference frequencies from said output and for passing the sum frequencies, whereby the output signal has the same duration modulation as the received signal with a constant fixed frequency carrier.

3. Apparatus for removing frequency variations in a received pulse duration modulated carrier wave signal comprising; a balanced modulator-mixer circuit having a first transistor and a second transistor; each of said transistors having an emitter, a collector and base circuit; means for applying said pulse duration modulated carrier wave signal to the base of the first transistor and the emitter of the second transistor; means for producing a local sinusoidal signal of a predetermined frequency; means for applying said local sinusoidal signal to the base of the second transistor and to the emitter of the first transistor, whereby the applied signals are canceled in the collector output of the transistors; first filter means, connected in the collector output of the transistors for eliminating the sum frequencies from said output and for passing the difference frequencies; a second balanced modulator-mixer circuit having a third transistor and a fourth transistor; each of the transistors of said balanced modulator-mixer having, an emitter, a collector and a base circuit; means for applying the output of the first filter means to the base of the third transistor and the emitter of the fourth transistor; means for applying said pulse duration modulated carrier wave signal to the base of the fourth transistor and the emitter of the third transistor, whereby the applied signals are canceled in the collector output of the third and fourth transistors; a second filter means connected in the collector output of the third and fourth transistors for eliminating the difference frequencies from said output and for passing the sum frequencies, whereby the output signal has the same duration modulation as the received signal with a constant fixed frequency carrier; a full wave rectifier connected to the output of said second filter; a third filter means, connected to the output of said rectifier, for smoothing and eliminating ripple from the signal, to thereby provide a square wave corresponding to the duration modulation of the received signal.

4. Apparatus for removing frequency variations in a received pulse duration modulated carrier wave signal comprising; a balanced modulator-mixer circuit having a first transistor and a second transistor; each of said transistors having an emitter, a collector and base circuit; means for applying said pulse duration modulated carrier wave signal to the base of the first transistor and the emitter of the second transistor; means for producing a local sinusoidal signal of a predetermined frequency; means for applying said local sinusoidal signal to the base of the second transistor and to the emitter of the first transistor, whereby the applied signals are canceled in the collector output of the transistors; first filter means, connected in the collector output of the transistors for eliminating the sum frequencies from said output and for passing the difference frequencies; a second balanced modulator-mixer circuit having a third transistor and a fourth transistor; each of the transistors of said balanced modulator-mixer having, an emitter, a collector and a base circuit; means for applying the output of the first filter means to the base of the third transistor and the emitter of the fourth transistor; means for applying said pulse duration modulated carrier wave signal to the base of the fourth transistor and the emitter of the third transistor, whereby the applied signals are canceled in the collector output of the third and fourth transistors; a second filter means connected in the collector output of the third and fourth transistors for eliminating the difference frequencies from said output and for passing the sum frequencies, whereby the output signal has the same duration modulation as the received signal with a constant fixed frequency carrier; rectifier and filter means connected to the output of said second filter; for producing a square wave signal output corresponding to the duration modulation of the received signal; means for differentiating said square wave signal, for producing a positive and a negative pulse corresponding to the leading and trailing edges respectively of said square wave signal; an output circuit; means for passing said positive pulses to said output circuit and means for inverting the negative pulses and for passing the inverted pulses to said output circuit, whereby two positive pulses appear in the output corresponding to the duration modulation of the received signal.

References Cited

UNITED STATES PATENTS

| | | | |
|---|---|---|---|
| 2,967,998 | 1/1961 | Hurvitz ---------- | 325—332 X |
| 3,119,067 | 1/1964 | Wohlenberg et al. -- | 325—434 X |
| 3,210,667 | 10/1965 | Hern et al. ------- | 325—434 X |

ROBERT L. GRIFFIN, *Primary Examiner.*

W. S. FROMMER, *Assistant Examiner.*